United States Patent
Takebe et al.

(10) Patent No.: US 8,300,942 B2
(45) Date of Patent: Oct. 30, 2012

(54) AREA EXTRACTION PROGRAM, CHARACTER RECOGNITION PROGRAM, AND CHARACTER RECOGNITION DEVICE

(75) Inventors: Hiroaki Takebe, Kawasaki (JP); Katsuhito Fujimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 939 days.

(21) Appl. No.: 12/366,004

(22) Filed: Feb. 5, 2009

(65) Prior Publication Data

US 2009/0202152 A1  Aug. 13, 2009

(30) Foreign Application Priority Data

Feb. 12, 2008  (JP) .................................. 2008-030887

(51) Int. Cl.
  *G06K 9/46* (2006.01)
  *G06K 9/72* (2006.01)
(52) U.S. Cl. .................. 382/181; 382/190; 382/229
(58) Field of Classification Search .................. 382/181, 382/187, 185, 176, 173, 224, 189, 229, 219, 382/226, 311, 282, 197, 228, 310, 190; 704/251; 463/1, 30; 709/203
See application file for complete search history.

(56) References Cited

U.S. PATENT DOCUMENTS

| 5,778,405 | A  | * | 7/1998  | Ogawa ........................... 715/259 |
| 6,185,333 | B1 | * | 2/2001  | Arai et al. ..................... 382/187 |
| 7,047,238 | B2 | * | 5/2006  | Tada et al. ........................... 1/1 |
| 7,142,716 | B2 | * | 11/2006 | Katsuyama et al. .......... 382/190 |
| 7,305,382 | B2 | * | 12/2007 | Kobayashi ..................... 707/709 |
| 7,440,617 | B2 | * | 10/2008 | Kaneda .......................... 382/187 |
| 2008/0273802 | A1 | | 11/2008 | Takebe et al. |

FOREIGN PATENT DOCUMENTS

| JP | 11-272804    | 10/1999 |
| JP | 2002-312365  | 10/2002 |
| WO | WO 2007/080642 | 7/2007 |

* cited by examiner

*Primary Examiner* — Sheela Chawan
(74) *Attorney, Agent, or Firm* — Staas & Halsey LLP

(57) ABSTRACT

An area extraction method including obtaining a character lattice showing a connection relation between unit areas, which are obtained by separating a character string pattern in an image into patterns each recognized as corresponding to a single character, judging whether or not all combinations of each of the unit areas in the obtained character lattice and each of the unit areas in a regular lattice defining a regular connection relation between the unit areas are likely to be established, generating a path coupling between nodes corresponding to the combination of the unit areas which is determined as likely to be established, determining an optimum path from the generated paths based on a degree of coincidence with the regular lattice or the character lattice, and extracting from an image the unit areas in the character lattice corresponding to the determined optimum path.

10 Claims, 14 Drawing Sheets

AREA EXTRACTION PROGRAM, CHARACTER RECOGNITION PROGRAM, AND CHARACTER RECOGNITION DEVICE

CROSS-REFERENCE TO RELATED APPLICATIONS

This application is based upon and claims the benefit of priority from the prior Japanese Patent Application No. 2008-030887, filed on Feb. 12, 2008, the entire contents of which are incorporated herein by reference.

BACKGROUND

1. Field

The present invention relates to a character recognition method and an area extraction method used for character recognition.

2. Description of the Related Art

In the prior art, there has been widely known an OCR (Optical Character Reader) for capturing a document such as a business form by a scanner to convert the captured document into image data, and thus to recognize a pattern in the image data as a character. In this OCR, an area taken out as a pattern corresponding to a single character is incorrectly separated, or a character corresponding to a pattern in each of the separated areas is not correctly recognized, and therefore, the result of character recognition is not always reliable. Particularity, when the quality of the image data is bad, or when a word constituted of similar characters such as a numeric character is included in image data, accuracy of the character recognition tends to be degraded.

For example, in the method proposed in Japanese Patent Laid-Open Publication No. 11-272804, the result of the character recognition is amended while being compared with words previously registered in a dictionary, whereby the accuracy of the character recognition is enhanced. Specifically, when the result of the character recognition of a word string having a hierarchical structure and constituted of a plurality of words, such as an address, is compared with words registered in a dictionary, a combination of words with the highest reliability is selected by considering the connection between the hierarchies and thus is determined as a final recognition result.

Further, for example, Japanese Patent Laid-Open Publication No. 2002-312365 proposes to retrieve the final recognition result by considering a plurality of possibilities in the result of the character recognition. Specifically, after a pattern including a character string is subjected to character recognition, the result of the character recognition is subjected to morphological analysis, and the area judged as a noun or an unregistered word is again subjected to the character recognition. The result of the character recognition obtained again is then added as a candidate to a first character recognition result, and the final recognition result is retrieved from a plurality of the candidates.

In general, many business forms include a plurality of information represented by regular expression with a fixed format, such as date and price. In this information, while the format is the same even if the business form is different, the number of digits of a numeric character is varied in each of the business forms, and therefore the number of characters may be different. Thus, when the character recognition is applied to a document such as a business form, a wild card in which the number of characters varies is required to be included, and, at the same time, information expressed by the regular expression is required to be correctly recognized.

However, when the number of characters in information varies, even if the format is fixed, there is a problem that it is difficult to perform accurate character recognition. Namely, when the number of characters in the information varies, in addition to an error in recognition of the characters, a pattern corresponding to a single character may be falsely separated. Thus, even when the information is expressed by the regular expression, there is a fixed limit in the enhancement of the accuracy of the character recognition. In the methods described in the above patent documents, although the words registered in a dictionary or a result obtained by performing again the character recognition is a candidate of the recognition result, the number of candidates is likely to increase. Particularly, when information of a character recognition target is, for example, a date, many similar numeric characters are included in the date, and, at the same time, the number of candidates of the recognition result is considered to be very large. Therefore, there arises the need to select the final recognition result from the many candidates, whereby a fixed limit occurs in the enhancement of the recognition accuracy.

In addition, when the number of the characters in the information varies, even if noise is included in an area corresponding to this information, the noise cannot be efficiently removed. Namely, when the number of characters is fixed, the character recognition can be performed while relatively efficiently removing noise at both ends of a character string pattern. However, when the number of the characters in the information varies, it is difficult to discriminate whether dirt or the like at the both ends of the character string pattern is noise or a character.

SUMMARY

Various embodiments of the present invention provide an area extraction method including obtaining a character lattice showing a connection relation between unit areas, which are obtained by separating a character string pattern in an image into patterns each recognized as corresponding to a single character, judging whether or not all combinations of each of the unit areas in the obtained character lattice and each of the unit areas in a regular lattice defining a regular connection relation between the unit areas are likely to be established, generating a path coupling between nodes corresponding to the combination of the unit areas which is determined as likely to be established, determining an optimum path from the generated paths based on a degree of coincidence with the regular lattice or the character lattice, and extracting from an image the unit areas in the character lattice corresponding to the determined optimum path.

Various embodiments of the present invention provide a character recognition device including an acquisition part acquiring a character lattice showing a connection relation between unit areas, which are obtained by separating a character string pattern in an image into patterns each recognized as corresponding to a single character, a judgment part judging whether or not all combinations of each of the unit areas in the character lattice acquired by the acquisition part and each of the unit areas in a regular lattice defining a regular connection relation between the unit areas are likely to be established, a generating part generating a path coupling between nodes corresponding to the combination of the unit areas, which is determined as likely to be established by the judging part, a determining part determining an optimum path from the paths generated by the generating part based on a degree of coincidence with the regular lattice or the character lattice, an extraction part extracting, from an image, the unit areas in the character lattice corresponding to the optimum path determined by the determining part, and a recognition part applying character recognition to a pattern in the unit area, extracted by the extraction part, with use of a dictionary for categories, including only characters in a category to which the unit areas in the regular lattice belong.

DETAILED DESCRIPTION OF THE PREFERRED EMBODIMENT

A feature of the embodiment to be hereinafter described is to calculate a reliability for each combination of unit areas in a character lattice, in which a character string area as a target for character recognition is expressed in lattice form, and unit areas in a regular lattice in which a regular expression defining information format is expressed in the lattice form, and thus to determine an optimum path from paths coupling nodes corresponding to the combination with a high reliability, whereby an area that corresponds to the optimum path and will undergo the character recognition is extracted. Hereinafter, one embodiment of the invention is described in detail with reference to the drawings.

Figure 1:
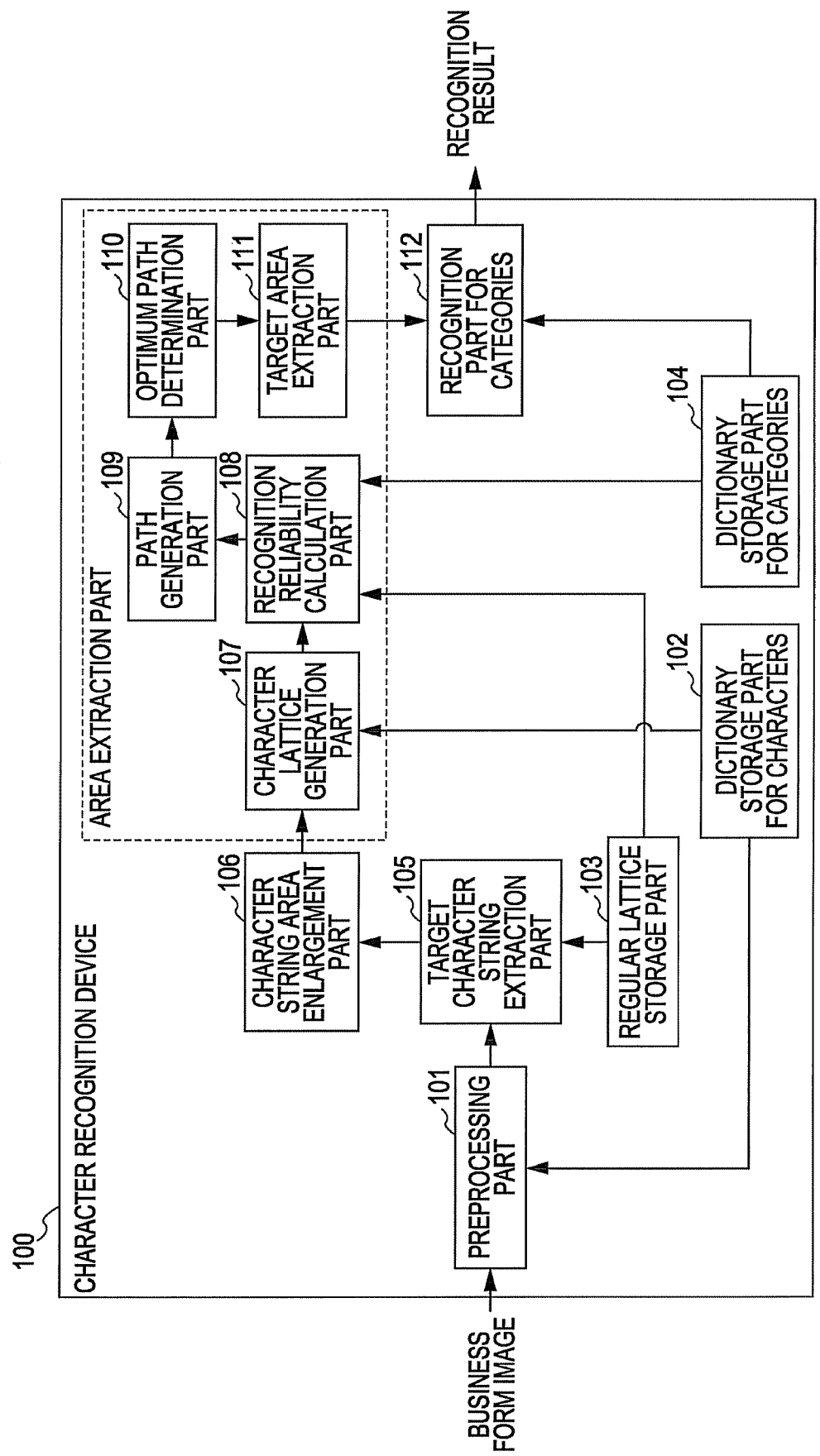
FIG. 1 is a block diagram showing a configuration of a relevant part of a character recognition device according to one embodiment.

FIG. 1 is a block diagram showing a configuration of a relevant part of a character recognition device 100 according to one embodiment. The character recognition device 100 has a preprocessing part 101, a dictionary storage part 102 for characters, a regular lattice storage part 103, a dictionary storage part 104 for categories, a target character string extraction part 105, a character string area enlargement part 106, a character lattice generation part 107, a recognition reliability calculation part 108, a path generation part 109, an optimum path determination part 100, a target area extraction part 111, and a recognition part 112 for categories.

The preprocessing part 101 applies the character recognition, in which a dictionary for characters stored in the dictionary storage part 102 for characters is used, to a business form including a pattern of information expressed by regular expression, such as a date, and obtains a character string expressed by a character string pattern of the entire image of the business form.

The dictionary storage part 102 for characters stores a dictionary for characters including all characters that can be included in the business form image. Namely, in the normal character recognition, the dictionary storage part 102 stores the dictionary for characters used for comparison with a pattern in an image.

The regular lattice storage part 103 stores a regular lattice defining the regular expression in the business form. Namely, the regular lattice storage part 103 stores a single character of a unit area in the information expressed by the regular expression and the regular lattice defining the connection relation between the unit areas. Specifically, the regular lattice storage part 103, as shown in, for example, FIG. 2, stores a single character of unit areas e1 to e11 in a date and the connection relation between these unit areas. Hereinafter, the description proceeds using a regular lattice of FIG. 2 as an example.

Figure 2:
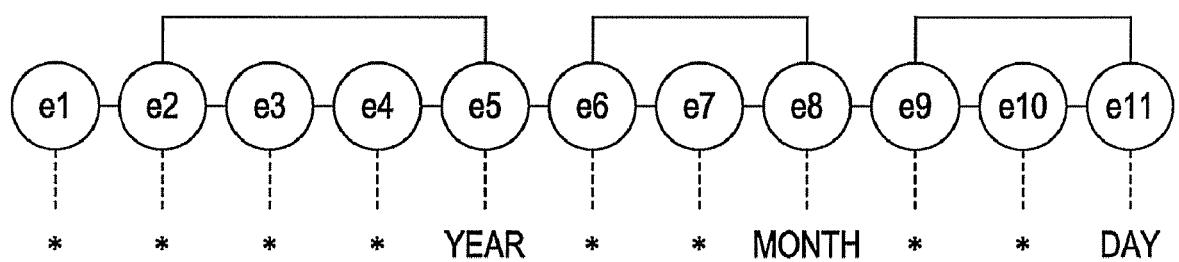
FIG. 2 is a view showing an example of a regular lattice according to one embodiment.

In an example shown in FIG. 2, the unit areas e1 to e4 respectively correspond to numeric characters showing a year, and the unit area e5 corresponds to a character "年 (year)". The unit areas e6 and e7 correspond to a numeric character showing a month, and the unit area e8 corresponds to a character "月(month)". The unit areas e9 and e10 correspond to a numeric character showing a day, and the unit area e11 corresponds to a character '日(day)". For example, when a year is expressed by the Christian Era, the digit number is 4, and therefore, all the unit areas e1 to e4 correspond to a numeric character. When the year is expressed by the name of an era, the digit number is 2, and therefore, only the unit areas e1 and e2 correspond to a numeric character. Thus, when the year is expressed by the name of an era, the unit area e5 connects to the unit area e2. Likewise, since a month and a day have 1 or 2 figures, the unit area e8 or e11 may be directly connected to the unit area e6 or e9, or the unit area e8 or e11 may be connected to the unit areas e6 and e7 or the unit areas e9 and e10.

The dictionary storage part 104 for categories classifies the character, included in the dictionary for characters, by categories and stores a dictionary for categories in which characters are included for each category. Namely, the dictionary storage part 104 stores a plurality of the dictionaries respectively belonging to different categories, such as a dictionary belonging to a category of numeric characters and a dictionary belonging to a category of characters used in a date. In FIG. 1, although the dictionary storage part 102 for characters and the dictionary storage part 104 for categories are separately provided, they may be integrated. Further, instead of storing different dictionaries as the dictionary for characters and the dictionary for categories, one dictionary for characters and a plurality of definitions of categories may be stored.

Figure 3:
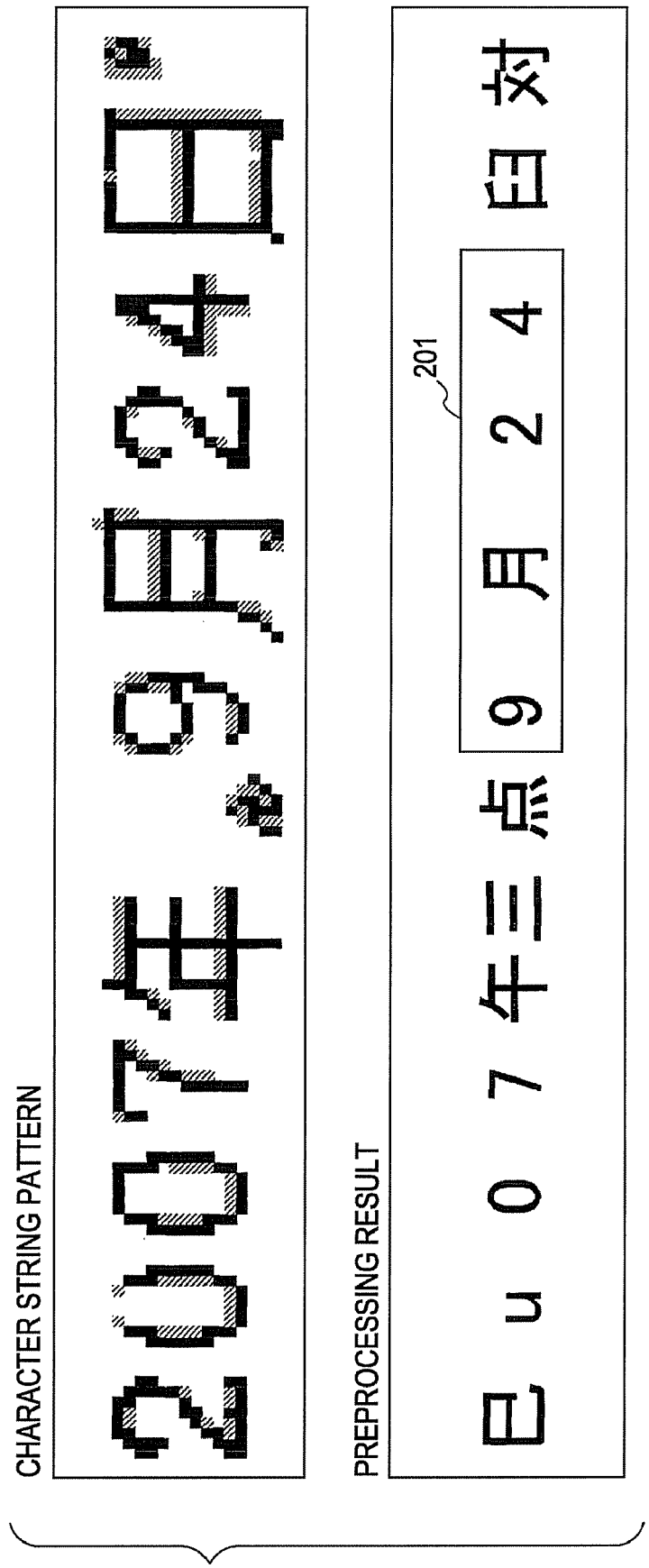
FIG. 3 is a view showing an example of a preprocessing result according to one embodiment.

The target character string extraction part 105 extracts a target character string, in which at least a part of the form coincides with the form in the regular lattice stored in the regular lattice storage part 103, from the character strings obtained as the result of the character recognition by the preprocessing part 101. Specifically, for example, when a preprocessing result shown at the bottom of FIG. 3 is obtained from the character string pattern shown at the top of FIG. 3, a character string 201 recognized as "9 月24" coincides with the connection relation between the unit areas e6, e8, e9, and e10 in the regular lattice shown in FIG. 2, and therefore, the target character string extraction part 105 extracts the character string 201. In the extraction of the target character string by the target character string extraction part 105, the technique described in International Publication No. WO 2007/080642 or other techniques can be used.

The character string area enlargement part 106 enlarges an area including a pattern corresponding to the target character string extracted by the target character string extraction part 105 and determines a character string area corresponding to the entire information shown by the regular lattice. Specifically, in a pattern corresponding to the target character string, the character string area enlargement part 106 calculates an average character size of a single character of the pattern and an average character interval between the patterns corresponding to a single character and enlarges the area including the pattern corresponding to the target character string in units of the area size as the sum of them. When a new pattern corresponding to a single character is included in the enlarged area, the character string area enlargement part 106 further enlarges the area. Thereafter, the character string area enlargement part 106 continues the enlargement of the area until a new pattern corresponding to a single character is not included in the enlarged area and, thus, finally obtains the character string area in which the pattern corresponding to a single character does not exist adjacent thereto.

The character lattice generation part 107 applies the character recognition, in which the dictionary for characters stored in the dictionary storage part 102 for characters is used, to the pattern in the character string area obtained by the character string area enlargement part 106 and generates a character lattice showing a single character of the unit area in the character string and the connection relation between the unit areas. Namely, the character lattice generation part 107 separates the pattern in the character string area into the unit areas corresponding to a single character and applies the character recognition to the pattern in each of the unit areas. At this time, when there are a plurality of candidates for separating the unit area, the character lattice generation part 107 applies the character recognition to the pattern in the unit area for each of the candidates.

Figure 4:
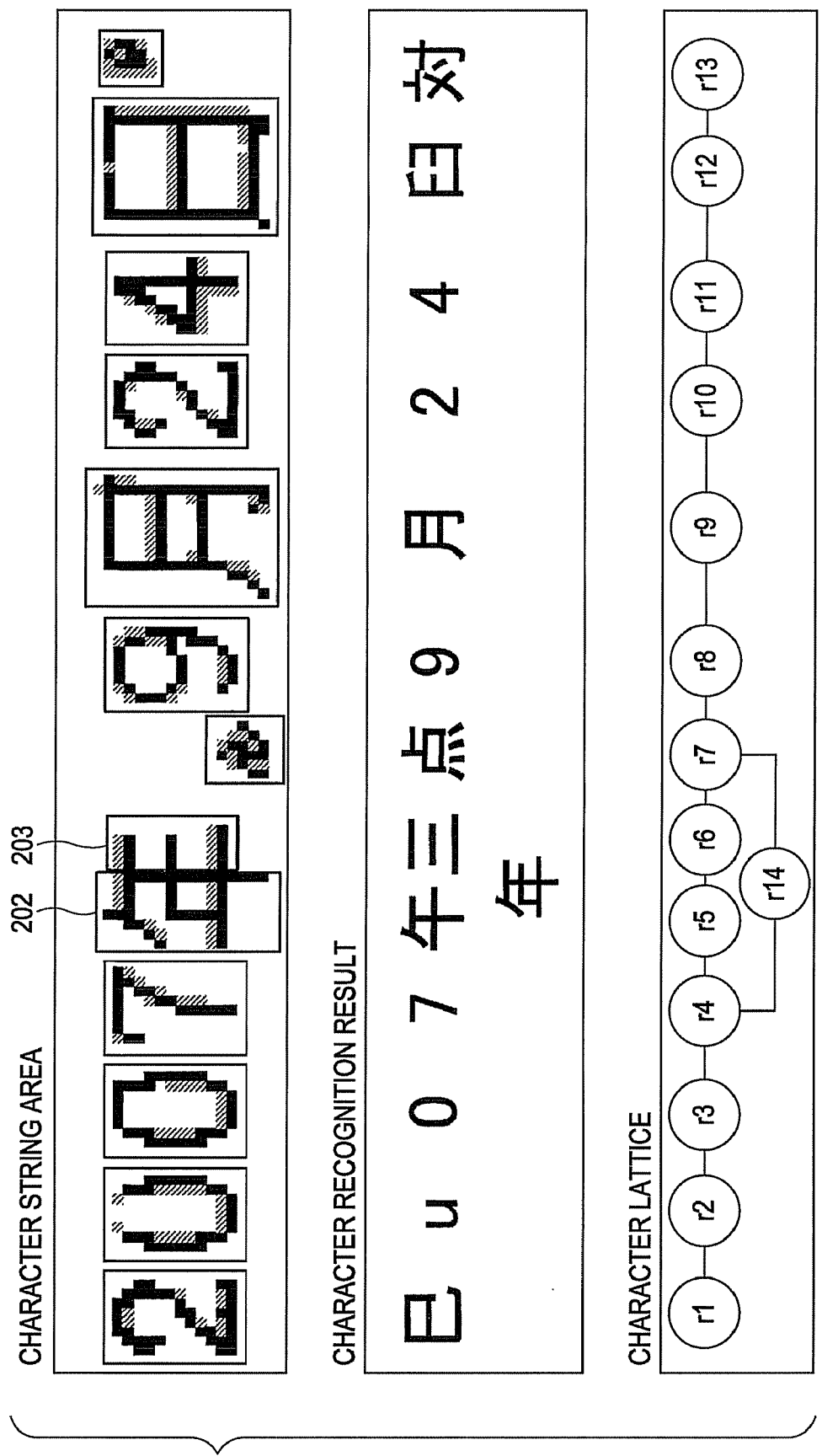
FIG. 4 is a view showing an example of a character lattice according to one embodiment.

Specifically, for example, when the pattern in the character string area shown at the top of FIG. 4 is separated into the unit areas, with regard to the pattern showing "年", the character lattice generation part 107 executes the character recognition for a candidate where the entire pattern is regarded as one unit area and a candidate where the pattern is separated into unit areas 202 and 203. As a result, as shown, for example, at the middle of FIG. 4, with regard to the pattern showing "年", the character lattice generation part 107 obtains the character recognition result corresponding to one character "年" and the character recognition result corresponding to two characters "午" and "三".

Then, the character lattice generation part 107 regards as the character lattice the connection relation between the unit areas in each candidate for separating the unit area. Specifically, the character lattice generation part 107, as shown, for example, at the bottom of FIG. 4, generates as the character lattice a single character of unit areas r1 to r14 in each of the candidates for separating the unit area and the connection relation between these unit areas. Namely, in the example of the character string area shown at the top of FIG. 4, there are a case where the pattern showing "年" is separated into the unit areas r5 and r6 and a case where the pattern is regarded as one unit area r14. When the pattern showing "年" is regarded as one unit area r14, not the unit areas r5 and r6 but the unit area r14 is connected to the unit areas r4 and r7. Thus, the character lattice generation part 107 generates the character lattice shown at the bottom of FIG. 4.

When the character lattice generation part 107 executes the character recognition in the unit area, a distance value (for example, a value such as Mahalanobis distance) showing a degree of similarity between the pattern in each of the unit areas and the pattern of the character as the character recognition result is calculated. As the distance value is smaller, the pattern in the unit area and the pattern of the character included in the dictionary for characters are more similar to each other, and thus it can be said that the accuracy of the character recognition is high.

The recognition reliability calculation part 108 calculates the recognition reliability, showing the reliability in the character recognition, for all the character recognition results in the unit areas in the character lattice generated by the character lattice generation part 107 and, with regard to all combinations of the unit area in the character lattice and the unit areas in the regular lattice, determines whether or not the unit areas are highly likely to correspond to each other.

Specifically, with regard to the unit areas r1 to r14 in the character lattice in the above example, the recognition reliability calculation part 108 discriminates a category in the case where the unit areas r1 to r14 are assumed to respectively correspond to the unit areas e1 to e11 in the regular lattice and executes the character recognition using the dictionary for categories stored in the dictionary storage part 104 for categories, limiting to the discriminated category. Thus, for example, when the unit area r1 in the character lattice and the unit area e1 in the regular lattice are assumed to correspond to each other, the unit area e1 corresponds to the numeric character, and therefore, the recognition reliability calculation part 108 executes the character recognition, limiting the pattern of the unit area r1 to the category of numeric characters. At this time, the recognition reliability calculation part 108 calculates the distance value showing the degree of the similarity between the pattern in each unit area and the pattern of the character as the character recognition result.

Likewise, when the unit area r1 in the character lattice and the unit area e5 in the regular lattice area are assumed to correspond to each other, the unit area e5 corresponds to the character "年", and therefore, the recognition reliability calculation part 108 recognizes the pattern of the unit area r1 as "年", and calculates the distance value showing the degree of the similarity.

The recognition reliability calculation part 108 then judges whether or not the combinations of the unit areas are established on the basis of a ratio of the distance value in the case where the dictionary for characters calculated by the character lattice generation part 107 is used to the distance value in the case where the dictionary for categories is used. Namely, the recognition reliability calculation part 108 divides the distance value (dc) in the case where the dictionary for characters is used by the distance value (d1) in the case where the dictionary for categories is used to calculate the recognition reliability (=dc/d1) and determines that the combinations with the recognition reliability not less than a predetermined threshold value is likely to be established.

In the above case, if the combination of the unit areas in the character lattice and the unit areas in the regular lattice is established, it is considered that the character recognition result is the same in both cases where the dictionary for characters is used and where the dictionary for categories is used. Therefore, the distance value in each case is the same (dc=d1), and the recognition reliability is 1. Meanwhile, if the combination of the unit area in the character lattice and the unit area in the regular lattice is not established, it is considered that the character included in the dictionary for characters is further similar to the character recognition result.

Therefore, the distance value in the case where the dictionary for characters is used is not more than the distance value in the case where the dictionary for categories is used (dc≦d1). As a result, the recognition reliability is not more than 1, and the lower the accuracy of the character recognition result in the case where the dictionary for categories is used (namely, the larger the distance value d1), the smaller the recognition reliability.

The recognition reliability calculation part 108 determines from the recognition reliability whether or not all the combinations of the unit areas in the regular lattice and the unit areas in the character lattice is likely to be established, generates a correspondence table specifying the combinations, which is likely to be established, as a node, and outputs the correspondence table to the path generation part 109. Specifically, the recognition reliability calculation part 108, as shown in, for example, FIG. 5, outputs the correspondence table, in which the combinations of the unit areas likely to be established are shown by the nodes (black circles), to the path generation part 109.

In the correspondence table generated by the recognition reliability calculation part 108, the path generation part 109 executes a path generation processing of sequentially coupling the nodes as the combinations of the unit areas likely to be established. Specifically, the path generation part 109 couples the nodes in the correspondence table shown in, for example, FIG. 5 in accordance with condition to generate the path. In the condition, a predetermined number of unit areas connecting to the unit areas corresponding to a newly coupling node are extracted, and regarding the nodes constituted of the extracted unit areas, the node with the maximum coupling number is coupled to the newly coupling node. Namely, regarding the nodes constituted of the combination of the unit area adjacent to the unit area in the regular lattice corresponding to the newly coupling node and the unit area adjacent to the unit area in the character lattice corresponding to the newly coupling node, the node passing through the largest number of nodes is coupled to the newly coupling node.

Meanwhile, when there are a plurality of the nodes with the largest coupling number, regarding these nodes, the node included in the path with the largest reproducing ratio is coupled to the newly coupling node. The reproducing ratio shows the level of reproducing the connection relation in the regular lattice. The path generation processing by the path generation part 109 is described in detail later.

Figure 6:
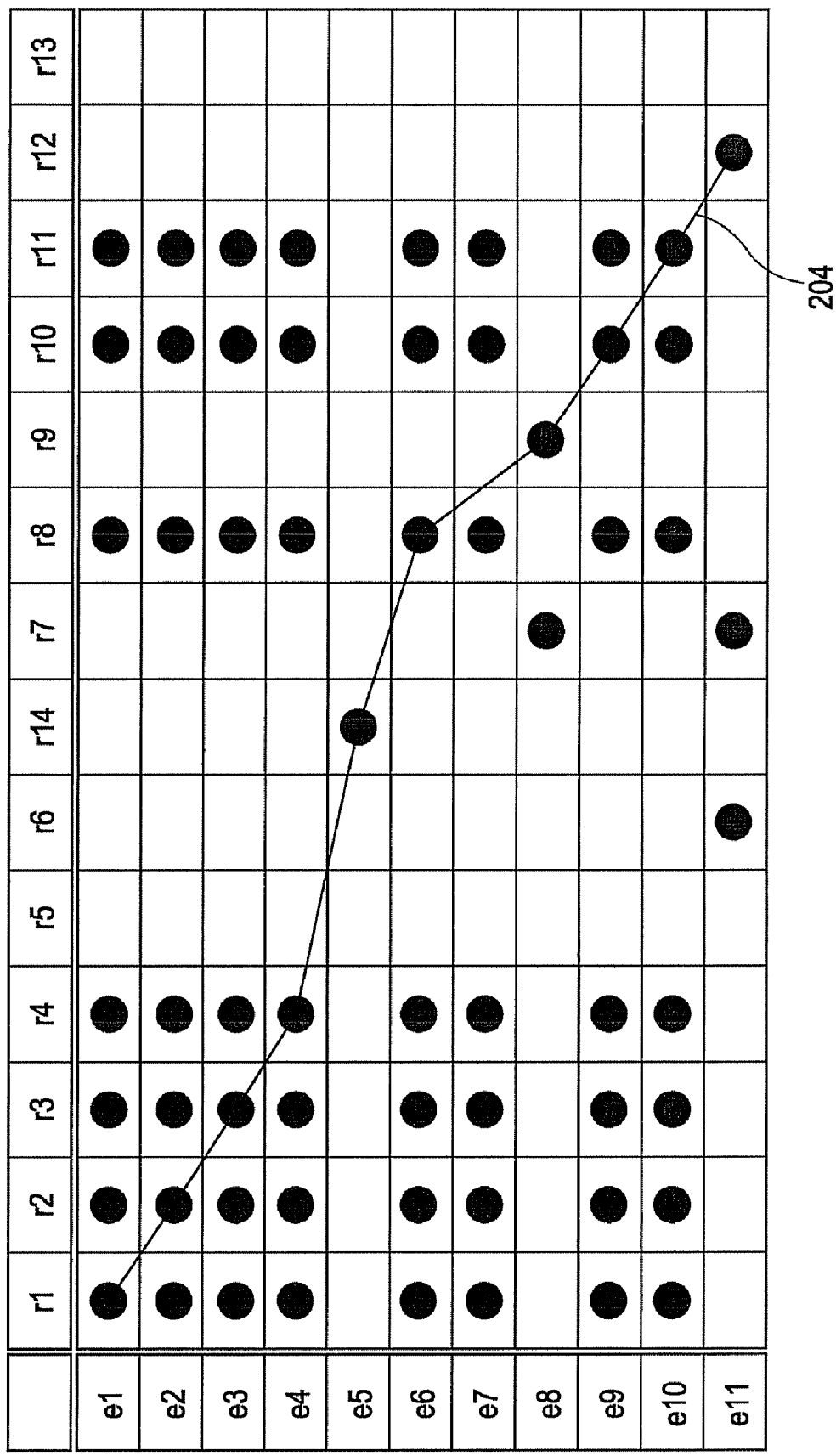
FIG. 6 is a view showing an example of an optimum path according to one embodiment.

When the path generation processing for all nodes on the correspondence table is completed by the path generation part 109, the optimum path determination part 110 determines one optimum path with the largest reproducing ratio showing the level of reproducing the connection relation in the regular lattice and with the largest matching ratio showing the level of fitting to the connection relation in the character lattice. Namely, the optimum path determination part 110 selects an optimum path 204 on the correspondence table, as shown, for example, in FIG. 6. In this case, in the optimum path 204, the unit areas are coupled in the regular lattice so that e1→e2→e3→e4→e5→e6→e8→e9→e11, and therefore, the connection relation, in which the unit areas are connected in the regular lattice shown in FIG. 2 so that e1→e2→e3→e4→e5→e6→e8→e9→e10→e11, is completely reproduced. Further, in the optimum path 204, the unit areas are coupled in the character lattice so that r1→r2→r3→r4→r14→r8→r9→r10→r11→r12, and therefore, compared with the connection relation in which the unit areas are connected in the character lattice shown at the bottom of FIG. 4 so that r1→r2→r3→r4→r14→r7→r8→r9→r10→r→r12→r13, it is found that 10 unit areas except for the unit areas r7 and r13 are matched.

The optimum path determination part 110 determines the optimum path based on the reproducing ratio and the matching ratio of each path. However, at this time, the optimum path determination part 110 selects as the optimum path the path with the maximum reproducing ratio. When there are a plurality of paths with the maximum reproducing ratio, the path with the matching ratio that is the maximum of these paths is determined as the optimum path by the optimum path determination part 110.

Figure 7:
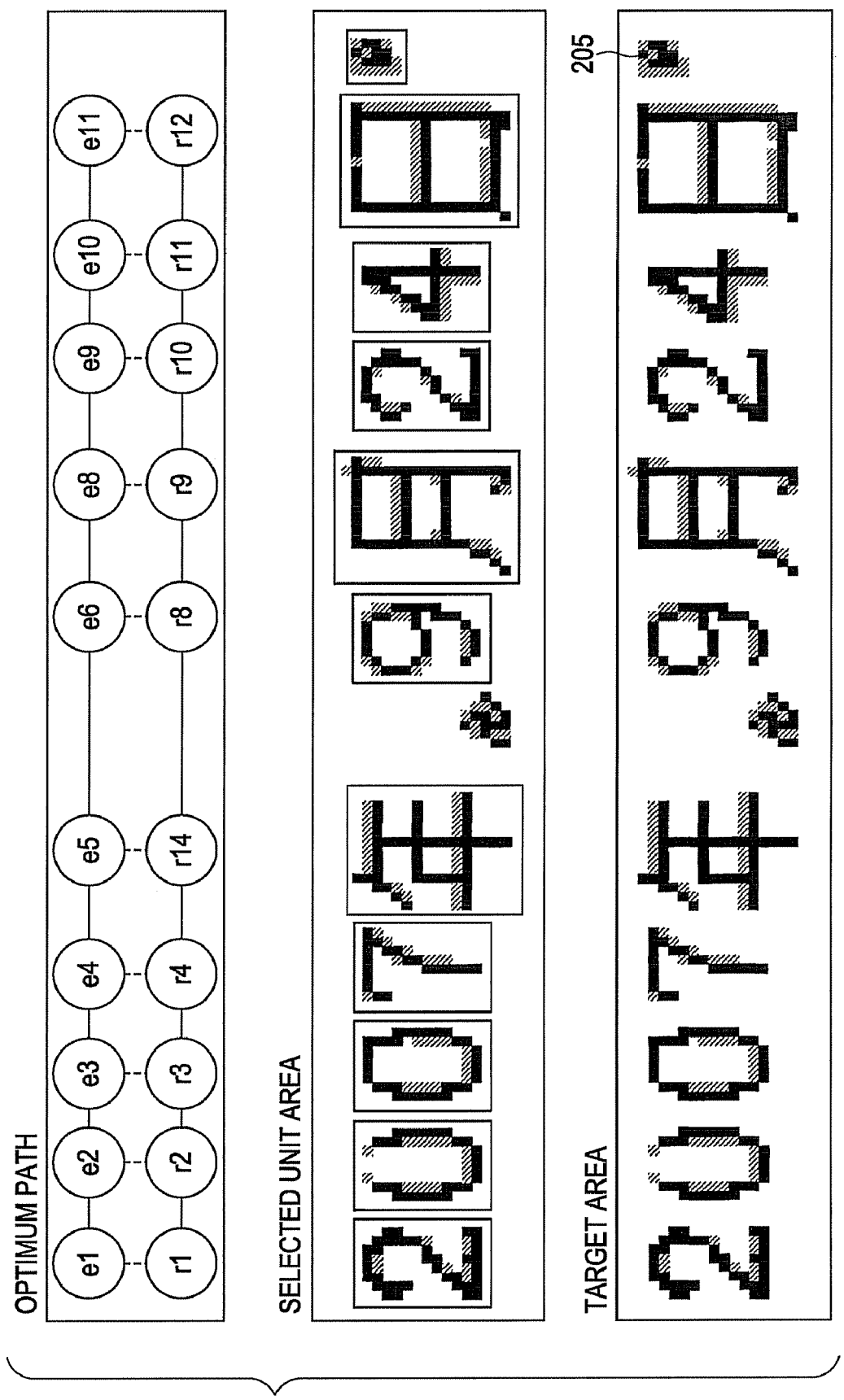
FIG. 7 is a view showing an example of a target area according to one embodiment.

The target area extraction part 111 extracts as the target area to finally undergo the character recognition the area including all the unit areas in the character lattice corresponding to the optimum path determined by the optimum path determination part 110. Specifically, for example when the optimum path shown at the top of FIG. 7 is determined, the target area extraction part 111, as shown at the middle of FIG. 7, selects the unit areas r1, r2, r3, r4, r14, r8, r9, r10, r11, and r12 in the character lattice corresponding to the optimum path and, as shown at the bottom of FIG. 7, extracts the minimum target area including the selected unit areas. Thus, the target area extraction part 111 extracts the target area except for a noise pattern 205 at the bottom of FIG. 7.

The character lattice generation part 107 to the target area extraction part 111 form an area extraction part in the character recognition device 100 according to the present embodiment, the area extraction part extracting an area, which will actually undergo the character recognition, from a character string area in a business form image.

The recognition part 112 for categories applies the character recognition, in which the dictionary for categories stored in the dictionary storage part 104 for categories is used, to the pattern in the target area extracted by the target area extraction part 111 and outputs the recognition result. Namely, the recognition part 112 executes the character recognition in which categories are limited, using the dictionary for categories corresponding to a category of information shown by the pattern in the target area.

Figure 8:
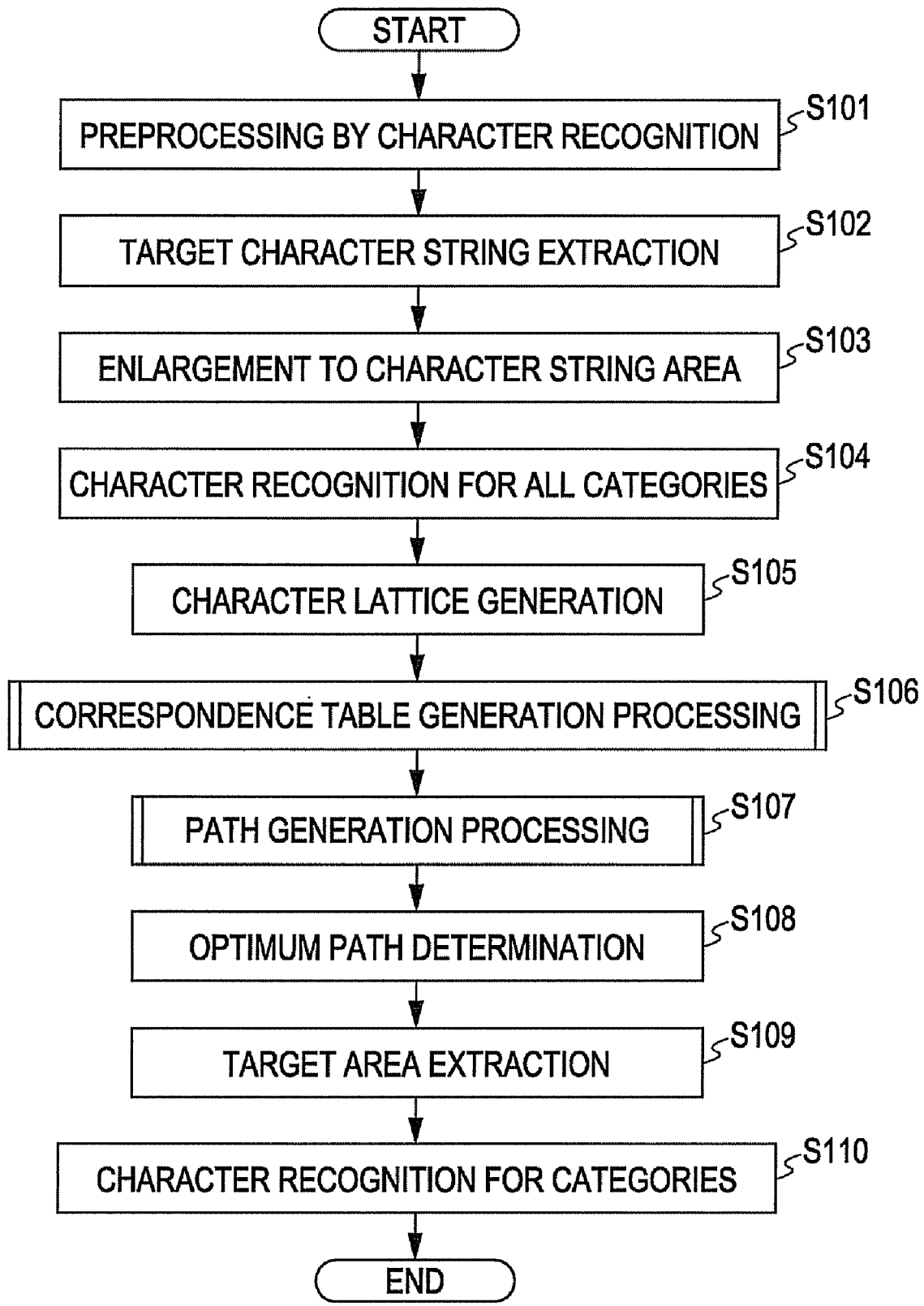
FIG. 8 is a flow diagram showing an operation of the character recognition device according to one embodiment.

Next, the operation of the character recognition device 100 having the above constitution is described with reference to a flow diagram shown in FIG. 8. In the following description, the examples shown in FIGS. 2 to 7 are appropriately referred according to need.

First, when a business form image is input to the character recognition device 100, the character recognition for the entire business form image is executed by the preprocessing part 101 (step S01). As a result of the preprocessing, the character recognition result including the characters shown at the bottom of FIG. 3 can be obtained, and the target character string in which a part coincides with the regular lattice is extracted from the character recognition result, obtained by the preprocessing, by the target character sting extraction part 105 (step S102). In this example, since the target character string 201: "9 月24" coincides with the connection relation between the unit areas e6, e8, e9, and e10 in the regular lattices shown in FIG. 2, the target character string 201 is extracted.

The area on the business form image corresponding to the target character string 201 is enlarged to the character string area, including the entire lump of information shown at the top of FIG. 4, by the character string area enlargement part 106 (step S103). Namely, the area on the business form image corresponding to the target character string 201 is enlarged in units of an area occupied by the pattern corresponding to a single character, and the character string area including all patterns adjacent to the target character string 201 is obtained by the character string area enlargement part 106. In this case, the pattern which is a lump of information and shows a date is included in the character string area. Further, as shown at the top of FIG. 4, a noise pattern except for a date is included in the character string area.

When the character string area including a lump of information is obtained, the character recognition in which the categories are not limited is applied to the pattern in the character string area by the character lattice generation part 107 (step S104). Namely, the character string area is separated into the unit areas, which include the pattern corresponding to a single character, by the character lattice part 107, and the pattern in each of the unit areas undergoes the character recognition using the dictionary for characters stored in the dictionary storage part 102 for characters. At this time, when there are a plurality of candidates for separating the unit area, the character lattice generation part 107 executes the character recognition based on each of the candidates, and, as shown at the middle of FIG. 4, a plurality of candidates of the character recognition result are obtained.

Then, the character lattice showing the connection relation between the unit areas in all the candidates of the character recognition result is generated by the character lattice generation part 107 (step S105). Namely, as shown at the bottom of FIG. 4, the character lattice showing the connection relation in each candidate between the separated unit areas r1 to r14 is generated by the character lattice generation part 107. At the same time, the distance value showing the degree of similarity between the character recognition result in each of the unit areas r1 to r14 and the characters included in the dictionary for characters is calculated. Hereinafter, the regular lattice and the character lattice are compared with each other, and when the unit area in the regular lattice and the unit area in the character lattice corresponded one-to-one, the combination of the unit areas consistent with the connection relation in each of the lattices is found.

Figure 5:
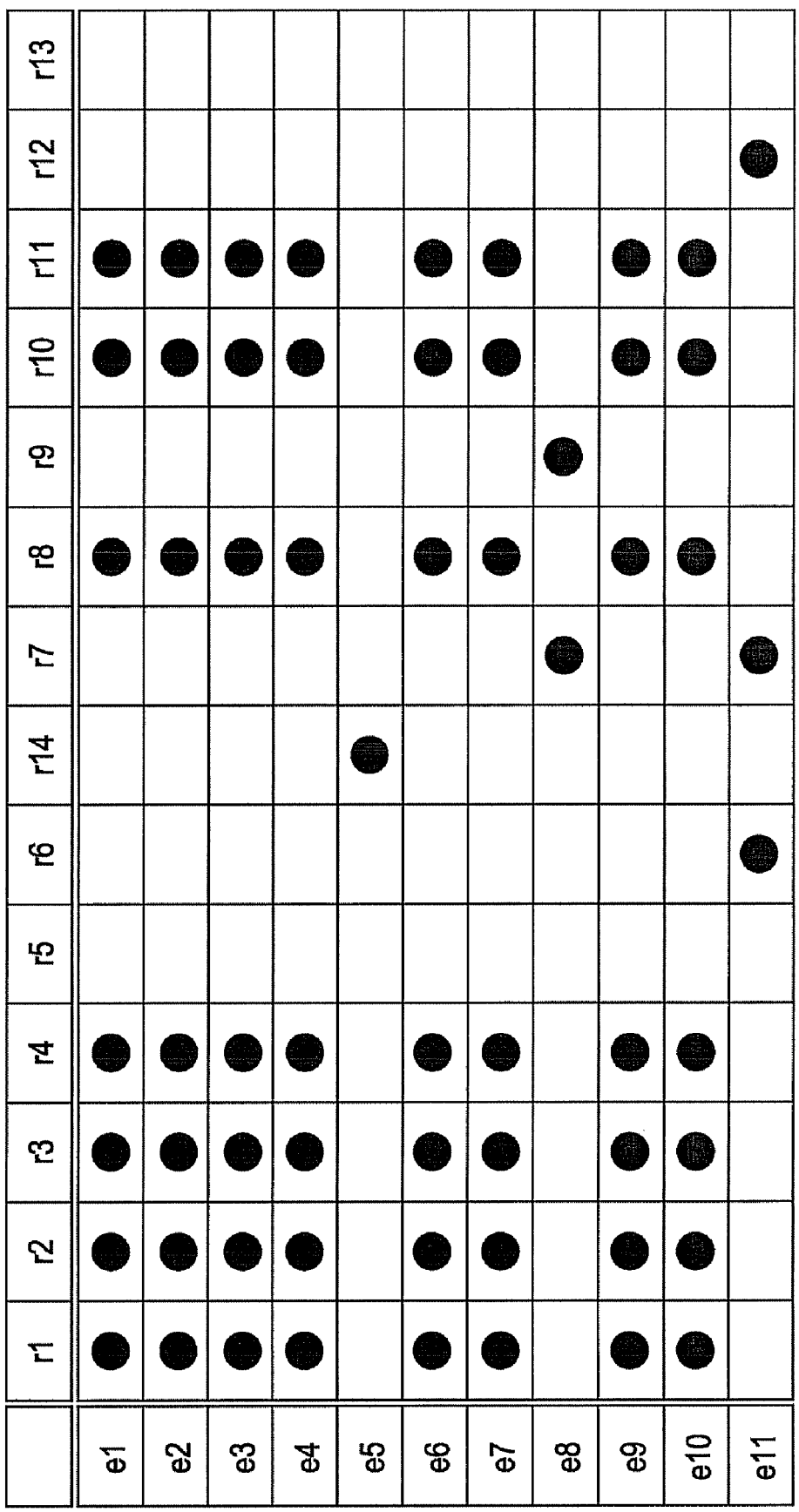
FIG. 5 is a view showing an example of a correspondence table according to one embodiment.

Namely, the recognition reliability is calculated from the character recognition result in each unit area in the character lattice by the recognition reliability calculation part 108, the combination of the unit areas likely to be established is selected based on the recognition reliability, and a correspondence table generation processing specifying the selected combination as the node is executed (step S106). In this correspondence table, as shown in FIG. 5, regarding the combinations of the unit areas in the regular lattice and the unit areas in the character lattice, the nodes shown by black circles are recorded in association with the combination likely to be established. The correspondence table generation processing by the recognition reliability calculation part 108 is described in detail later.

Then, the path generation processing of coupling the nodes in the correspondence table is executed by the path generation part 109 (step S107). The path generation processing is started from the node at the end of the correspondence table, and is performed by determining the preceding node coupling to the present node. The nodes are coupled so that the connection relation between the unit areas in the regular lattice and the unit areas in the character lattice is more faithfully reproduced. The path generation processing by the path generation part 109 is described in detail later.

When the path generation processing for all the nodes in the correspondence table is completed, the optimum path is determined from a plurality of paths, generated in the correspondence table, by the optimum path determination part 110 (step S108). Namely, the optimum path with the highest level coinciding with the regular lattice and the character lattice is determined by the optimum path determination part 110. Specifically, the path with the maximum reproducing ratio is selected as the optimum path by the optimum path determination part 110. The reproducing ratio shows the rate of the connection relation between the unit areas shown by each path reproducing the connection relation between the unit areas in the regular lattice. When there are a plurality of paths with the maximum reproducing ratio, the path with the maximum matching ratio is selected as the optimum path by the optimum path determination part 110. The matching ratio shows the rate of the connection relation between the unit areas shown by these paths fitting to the connection relation between the unit areas in the character lattice.

When the optimum path is determined in the correspondence table, the target area, including all the unit areas in the character lattice corresponding to the optimum path, is extracted by the target area extraction part 111 (step S109). Namely, for example when the optimum path shown at the top of FIG. 7 is determined, as shown at the middle of FIG. 7, the unit areas r1, r2, r3, r4, r14, r8, r9, r10, r11, and r12 in the character lattice are selected by the target area extraction part 111, and as shown at the bottom of FIG. 7, the minimum area including the selected unit areas is extracted as the target area.

Then, the character recognition in which the dictionary for categories about a date is used is applied to the pattern in the target area by the recognition part 112 for categories (step S110). At this time, in the target area shown at the bottom of FIG. 7, since the noise pattern 205 included in the character string area shown at the top of FIG. 4 is eliminated, the accuracy of the character recognition can be enhanced. In addition, since the target area is extracted from the optimum path in the correspondence table, the information expressed by the regular lattice is highly likely to be included in the target area, and the character recognition in which the dictionary for categories corresponding to the regular lattice is used is applied to the pattern in the target area, whereby the accuracy of the character recognition can be further enhanced.

Figure 9:
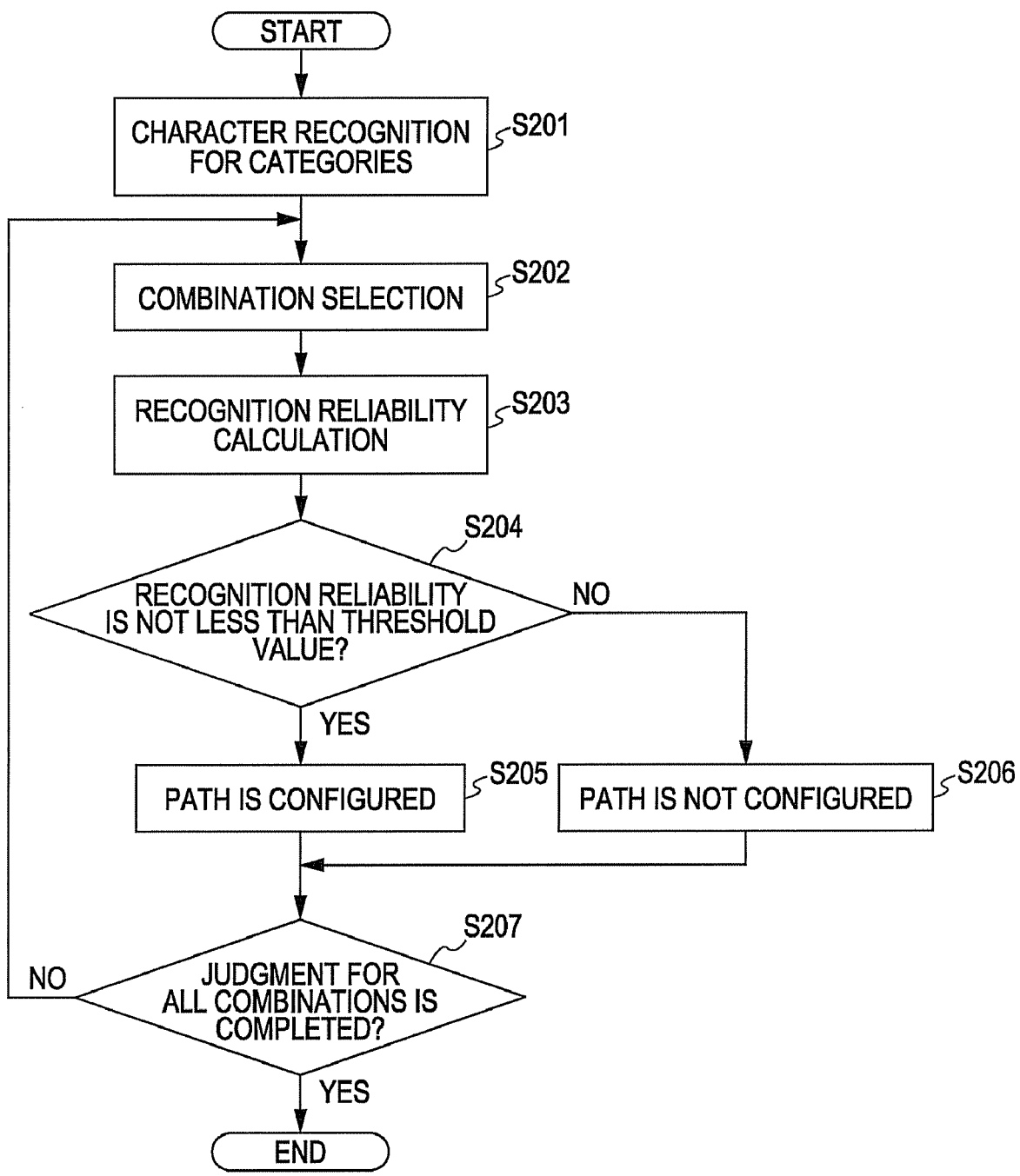
FIG. 9 is a flow diagram showing a correspondence table generation processing according to one embodiment.

Next, the correspondence table generation processing according to the present embodiment is described with reference to a flow diagram shown in FIG. 9.

The character lattice is generated by the character lattice generation part 107, and when the distance value between the character recognition result in each of the unit areas in the character lattice and the character in the dictionary for characters is calculated, the character recognition using the dictionary for categories is applied to the pattern in each of the unit areas by the recognition reliability calculation part 108 (step S201). In this case, the dictionary for categories about the category corresponding to the regular lattice is used, and the pattern in each of the unit areas is limited to, for example, a numeric character to undergo the character recognition, or is limited to characters "年月日" to undergo the character recognition. At the same time, the distance value showing the degree of similarity between the character recognition result for categories in each of the unit areas and the characters included in the dictionary for categories is calculated.

Then, one combination of the unit areas in the regular lattice and the unit areas in the character lattice is selected by the recognition reliability calculation part 108 (step S202). In this case, it is assumed that the combination of the unit area e1 and the unit area r1 is selected. When the combination of the unit areas is selected, the recognition reliability about this combination is calculated by the recognition reliability calculation part 108 (step S203). Specifically, the distance value of the character recognition using the dictionary for characters is divided by the distance value of the character recognition using the dictionary for categories corresponding to the unit area e1 and thus the recognition reliability is calculated.

Subsequently, whether or not the recognition reliability is not less than a predetermined threshold value is judged (step S204). When the recognition reliability is not less than the predetermined threshold value, the combination of the unit areas is determined as a combination in which the path is configured on the correspondence table (step S205). When the recognition reliability is less than the predetermined threshold value, the combination is determined as a combination in which the path is not configured on the correspondence table (step S206). When the combination of the unit area e1 and the unit area r1 is determined as the combination in which the path is configured, this combination is the node on the correspondence table. Hereinafter, the node on the correspondence table is described in a coordinate form like (e1, r1) by using the combination of the unit areas.

When the judgment whether or not the combination of the unit area e1 and the unit area r1 is the node using the recognition reliability is completed, it is determined whether or not the judgment of all the combinations of the unit areas is completed (step S207). At this time, the judgment only for the combination of the unit area e1 and the unit area r1 is completed, but the judgment for all the combinations is not completed (step S207 is "No"). Therefore, another combination of the unit areas (for example, the combination of the unit area e1 and the unit area r2) is selected (step S202). As in the above case, the judgment whether or not the combination of the unit areas is the node is repeated, and when the judgment for all the combinations of the unit areas is completed (step S207 is "Yes"), the correspondence table in which the combination likely to be established is specified as the node completes (see, FIG. 5).

Figure 10:
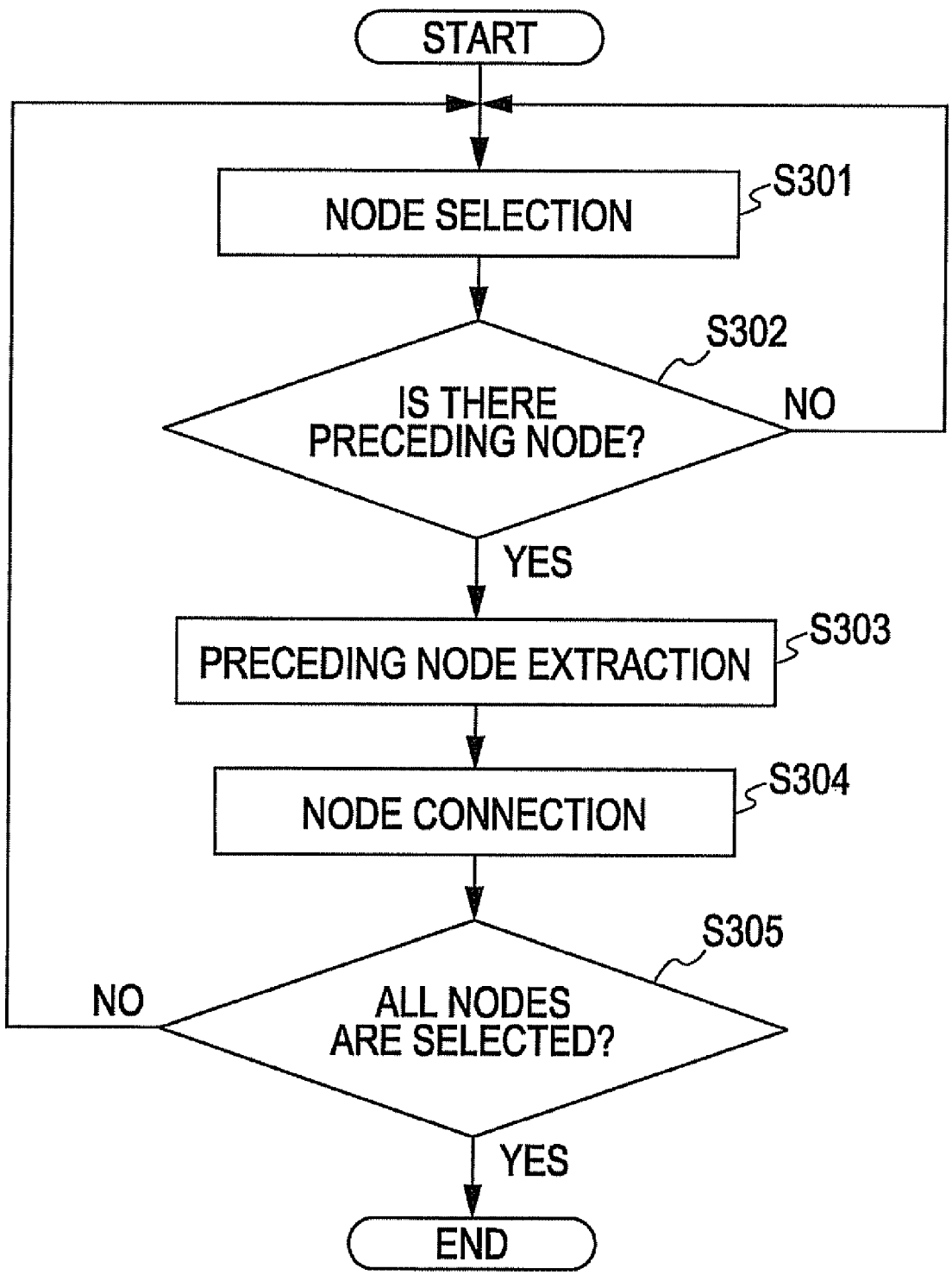
FIG. 10 is flow diagram showing a path generation processing according to one embodiment.

Next, the path generation processing according to the present embodiment is described with reference to a flow diagram shown in FIG. 10. Hereinafter, the correspondence table shown in FIG. 5 is assumed to be generated, and the description proceeds using specific examples.

When the correspondence table is generated by the recognition reliability calculation part 108, one node at the end of the correspondence table is selected by the path generation part 109 (step S301). In this case, (e1, r1) is first selected. Then, whether or not there is a node preceding (e1, r1) is determined (step S302). There is no unit area connecting before the unit area e1 and the unit area r1, and therefore, it is determined that there is no preceding node (step S302 is "No"), and thus the next node (e2, r1) is selected (step S301). However, there is no unit area connecting before the unit area r1, and therefore, it determined that there is no preceding node (step S302 is "No"), and thus (e3, r1) is selected. Hereinafter, in a similar manner, the presence of the preceding node is determined until reaching the node having the preceding node.

When (e2, r2) is selected, the unit area e1 is connected before the unit area e2, and the unit area r1 is connected before the unit area r2. Therefore, it is determined that there is the preceding node (step S302 is "Yes"), and the preceding nodes which correspond to a predetermined number of unit areas connected before each of the unit areas are extracted (step S303). When it is assumed that up to two preceding nodes which correspond to the unit areas connected to before each of the unit areas are extracted, (e1, r1) corresponding to the unit area e1 before the unit area e2 and the unit area r1 before the unit area r2 is extracted.

When the preceding nodes are extracted, one of the extracted preceding nodes and a present selected node is coupled to each other (step S304). However, in the above case, since only (e1, r1) is extracted as the preceding node, (e1, r1) and (e2, r2) are coupled to each other.

Thereafter, whether or not the selection of all nodes and the coupling of nodes are completed is determined (step S305). When there is an unselected node (step S305 is "No"), the unselected node is newly selected (step S301). When all nodes are selected (step S305 is "Yes"), it is determined that all the couplable nodes are coupled, and thus the path generation processing is completed.

Here, the coupling of nodes in the case where the preceding node is extracted is further described using specific examples.

Figure 11:
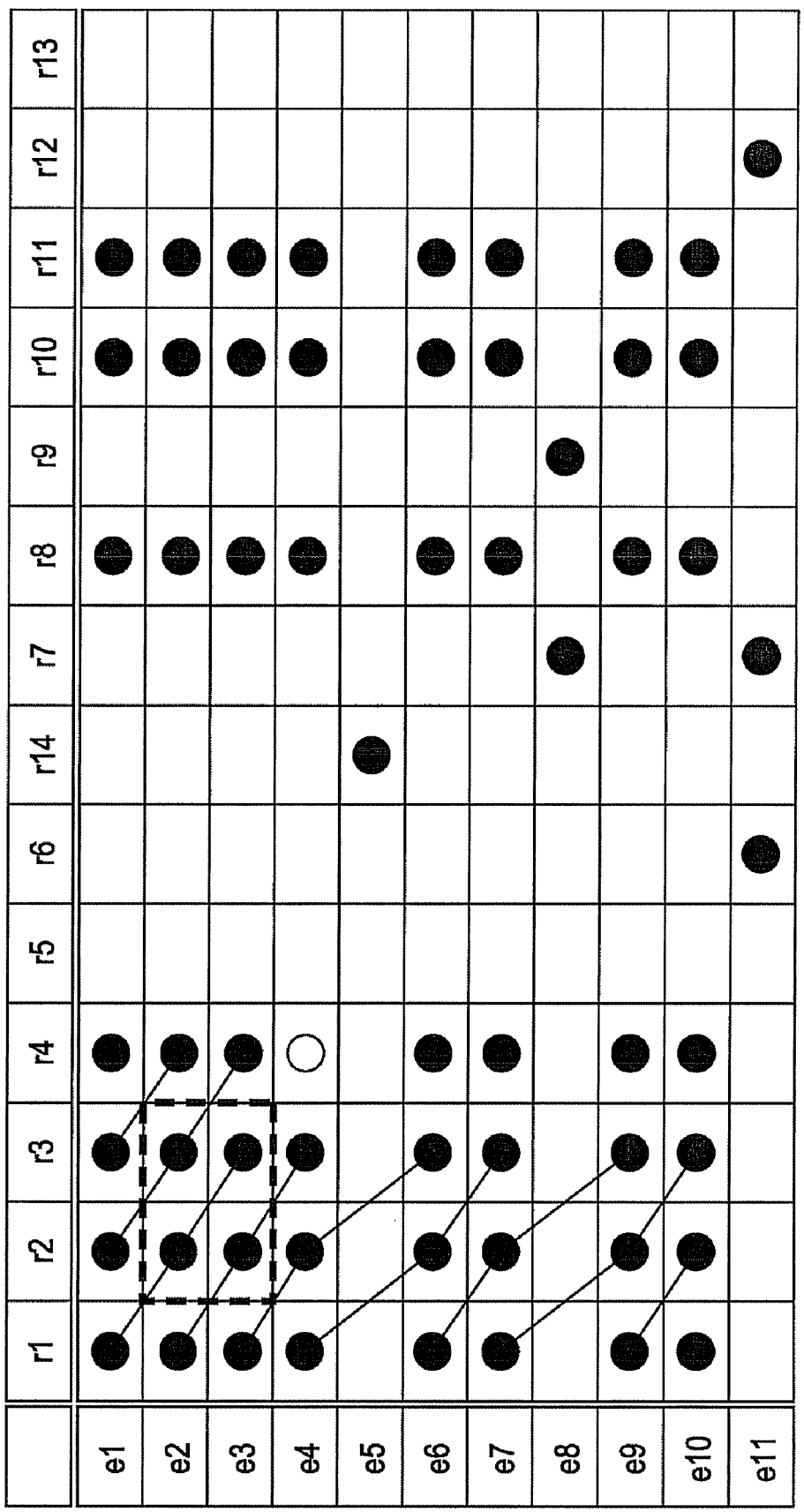
FIG. 11 is a view showing an example of coupling of nodes according to one embodiment.

The above-mentioned coupling of nodes is repeated, and when (e4, r4) shown by a white circle in FIG. 11 is selected, four preceding nodes (e2, r2), (e2, r3), (e3, r2), and (e3, r3) corresponding to the unit areas e2 and e3 before the unit area e4 and the unit areas r2 and r3 before the unit area r4 are extracted. These preceding nodes are surrounded by a dashed line in FIG. 11.

In the above case, (e4, r4) is coupled to the preceding node with the largest coupling number. Namely, while (e2, r2), (e2, r3), and (e3, r2) are respectively coupled to one preceding node, (e3, r3) is coupled to two preceding nodes. Therefore, (e4, r4) is coupled to (e3, r3).

Figure 12:
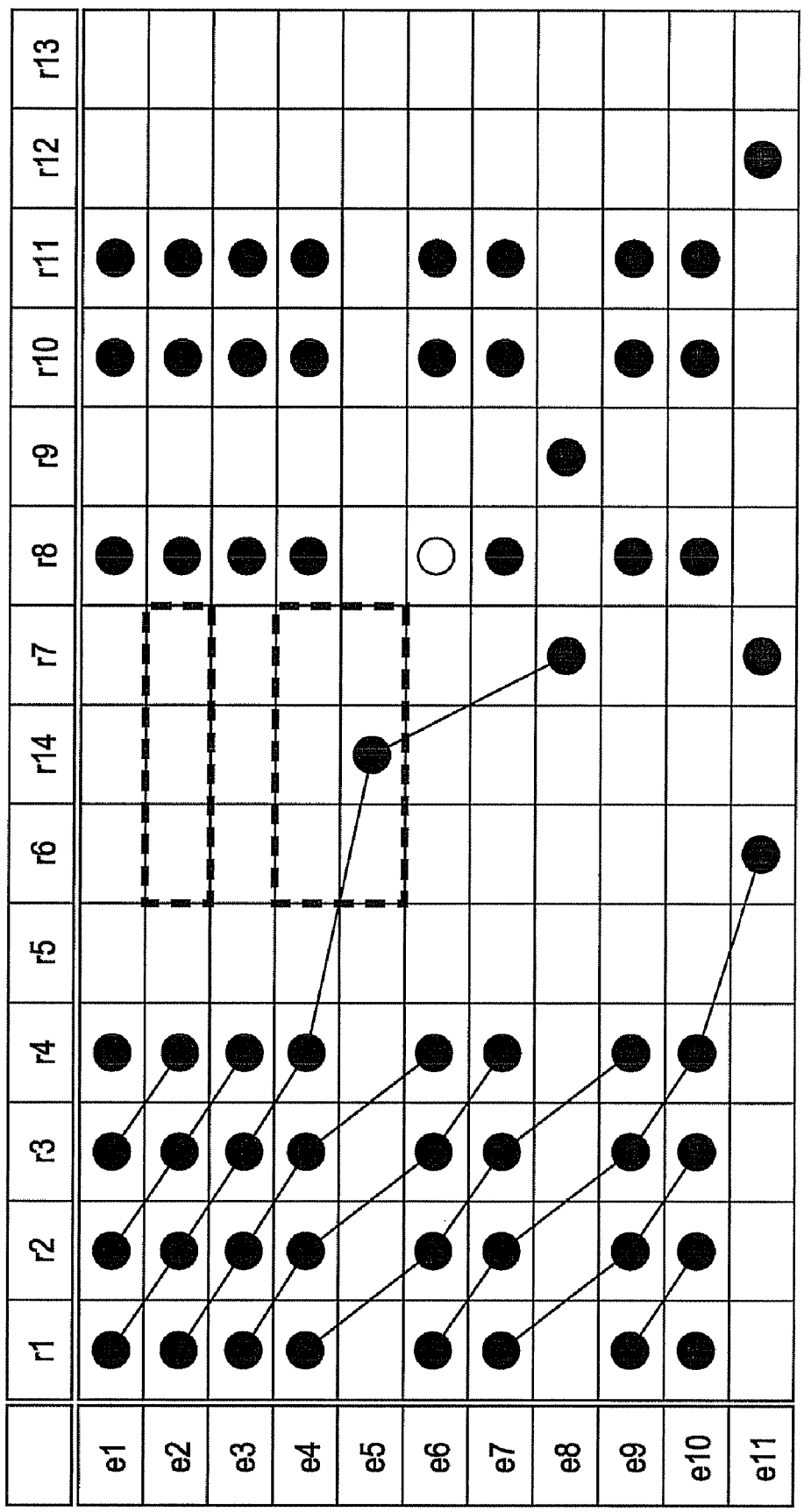
FIG. 12 is a view showing another example of coupling of nodes according to one embodiment.

Further, when (e6, r8) shown by a white circle in FIG. 12 is selected, the unit areas e4 and e5 can be regarded to be connected to each other before the unit area e6, and, at the same time, the unit areas e2 and e5 can be regarded to be connected to each other (see, FIG. 2). Likewise, the unit areas r6 and r7 can be regarded to be connected to each other before the unit area r8, and, at the same time, the unit areas r14 and r7 can be regarded to be connected to each other (see, the bottom of FIG. 4). Thus, when (e6, r8) is selected, the nodes in the range surrounded by the dashed line in FIG. 12 are extracted as the preceding nodes.

In the above case, since only one preceding node (e5, r14) exists in the range surrounded by the dashed line in FIG. 12, (e6, r8) is coupled to (e5, r14).

Figure 13:
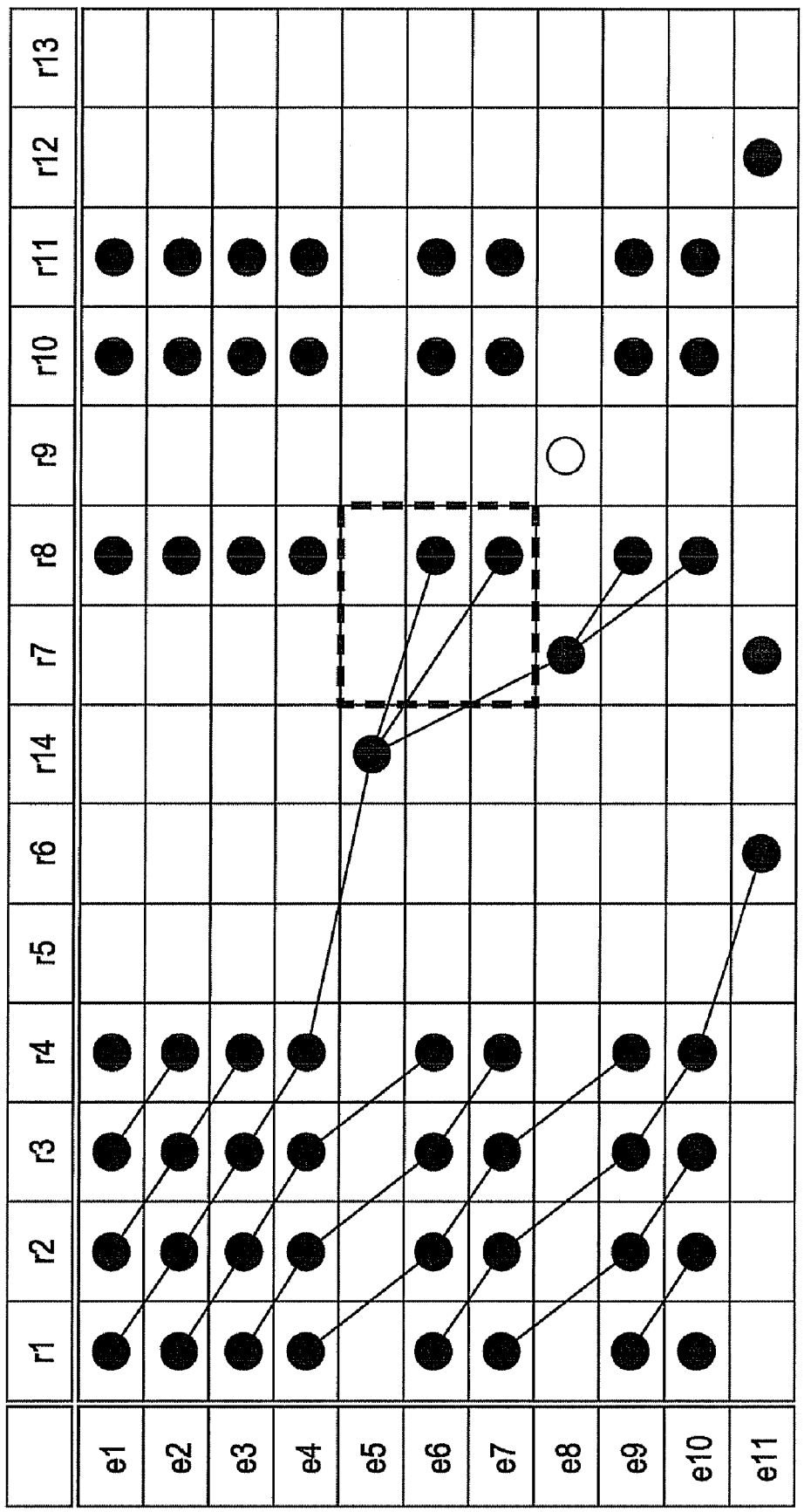
FIG. 13 is a view showing still another example of coupling of nodes according to one embodiment.

Further, when (e8, r9) shown by a white circle in FIG. 13 is selected, the unit areas e6 and e7 can be regarded to be connected to each other before the unit area e8, and, at the same time, the unit areas e5 and e6 can be regarded to be connected to each other (see, FIG. 2). In addition, the unit areas r7 and r8 are connected to each other before the unit area r9. Thus, when (e8, r9) is selected, the nodes in the range surrounded by the dashed line in FIG. 13 are extracted as the preceding nodes.

The two preceding nodes (e6, r8) and (e7, r8) are extracted, and each coupling number of these preceding nodes is the same. In this case, the preceding node with a large reproducing ratio of the path reaching each of the preceding nodes is coupled to (e8, e9). Namely, in the path reaching (e6, r8), the unit areas are connected so that e1→e2→e3→e4→e5→e6, and thus the connection relation from the unit area e1 to the unit area e6 in the regular lattice is completely reproduced. Meanwhile, in the path reaching (e7, r8), the unit areas are connected so that e1→e2→e3→e4→e5→e7, and the unit area e6 is not included in the connection relation. Therefore, the reproducing ratio of the connection relation from the unit area e1 to the unit area e7 in the regular lattice is smaller than (e6, r8). Thus, in this case, (e8, r9) is coupled to (e6, r8) with a larger reproducing ratio.

The node is sequentially coupled to the preceding node, whereby, in view of the character recognition accuracy and the connection relation in the lattice, all the paths for consistently connecting the combination of the unit area in the regular lattice and the unit area in the character lattice are generated. The path with the maximum reproducing ratio is selected as the optimum one from these paths, whereby the most accurate correspondence relation between the unit area in the regular lattice and the unit area in the character lattice can be obtained. The reproducing ratio is a ratio of the number of unit areas in the regular lattice, which correspond to the nodes through which the path passes, to the number of unit areas in the connection relation in the regular lattice. For example, with regard to the optimum path shown in FIG. 6, regarding 10 unit areas in the connection relation in the regular lattice, in which the unit are e7 is not included, the nodes corresponding to all the 10 unit areas are coupled, and thus the reproducing ratio is 1 (=10/10).

When there are a plurality of the paths with the maximum reproducing ratio, the path with the maximum matching ratio may be selected as the optimum path from these paths. The matching ratio is a ratio of the number of the unit areas in the character lattice, which correspond to the nodes through which the path passes, to the number of the unit areas in the connection relation in the character lattice. For example, with regard to the optimum path shown in FIG. 6, regarding 12 unit areas in the connection relation in the character lattice, in which the unit areas r5 and r6 are not included, the nodes corresponding to 10 unit areas are coupled, and thus the matching ratio is 0.83 (≈10/12).

As described above, according to the present embodiment, on the correspondence table in which, regarding all the combinations of the unit areas in the character lattice and the unit areas in the regular lattice, the combination with the recognition reliability not less than a predetermined threshold value is regarded as the node, the path coupling the nodes is generated, and the optimum path with the maximum reproducing ratio and the maximum matching ratio is determined. Therefore, the combination of the unit areas consistent with the regular lattice and the character lattice can be determined, whereby, even when a wild card in which the number of characters varies is included in the regular lattice, the correspondence relation between the unit areas can be accurately determined. In addition, the correspondence relation between the unit areas is determined by the determination of the optimum path, whereby the target area including the unit areas in the character lattice corresponding to the optimum path is extracted, and the character recognition for categories is applied to the pattern in the target area. Therefore, the character recognition can be efficiently and accurately applied to the information in which the number of characters varies and which is expressed by the regular expression.

Figure 14:
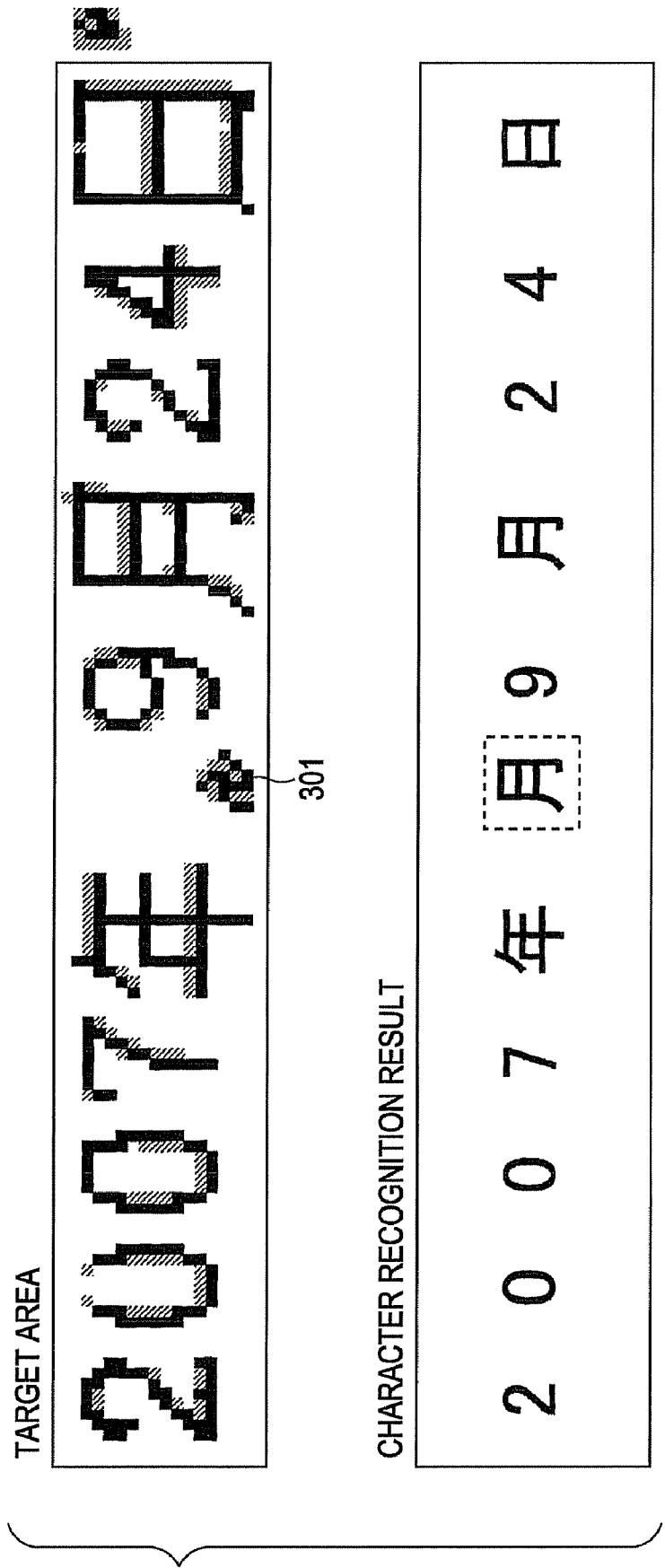
FIG. 14 is a view showing an example of a result of character recognition according to one embodiment.

In the above embodiment, the character recognition for categories is applied to the pattern in the target area after the extraction of the target area. In this case, for example, as shown at the top of FIG. 14, the character recognition for categories is applied also to a noise pattern 301 in the target area. Thus, as shown at the bottom of FIG. 14, the noise pattern 301 is falsely recognized as a character "月". However, since the recognition accuracy in this character recognition result is considered to be low, the area surrounded by a dashed line in which the recognition accuracy is not more than a predetermined reference and may be a blank.

Further, at the time when the optimum path is determined by the optimum path determination part 110, the correspondence relation between the unit areas in the regular lattice and the unit areas in the character lattice can be obtained, and therefore, the character recognition for categories may be executed for each of the unit areas. In this case, as shown at the middle of FIG. 7, since a noise pattern is not included in the unit areas corresponding to the optimum path, the character recognition accuracy can be further enhanced.

In the above embodiment, although the processing of extracting the target area and the character recognition processing are executed by the character recognition device 100, these processings are described as programs with a computer readable form, and it is possible to make a computer execute these programs.

The embodiments described above are only examples, and it is apparent to those skilled in the art that the invention can be modified or altered by combining the component elements of each embodiment. It will also be apparent to those skilled in the art that the embodiments described above can be variously modified without departing from the spirit and scope of the invention described in the appended claims.

What is claimed is:

1. A non-transitory computer readable recording medium in which a program executing an area extraction method is recorded, the program when executed by a computer causes the computer to perform the method comprising:
    an obtaining step of obtaining a character lattice showing a connection relation between unit areas, which are obtained by separating a character string pattern in an image into patterns each recognized as corresponding to a single character;
    a judging step of judging whether or not all combinations of each of the unit areas in the character lattice obtained in the obtaining step and each of the unit areas in a regular lattice defining a regular connection relation between the unit areas are likely to be established;
    a generating step of generating a path coupling between nodes corresponding to the combination of the unit areas, which is determined as likely to be established in the judging step;
    a determining step of determining an optimum path from the paths generated in the generating step based on a degree of coincidence with the regular lattice or the character lattice; and
    an extracting step of extracting, from an image, the unit areas in the character lattice corresponding to the optimum path determined in the determining step.

2. The area extraction program as claimed in claim 1, wherein the generating step further comprises:
    a node extracting step of extracting a newly coupling node newly coupled to an other node and a preceding node which has been already coupled to other node and is in the combination of the unit areas in a predetermined range from the unit area corresponding to the newly coupling node in the connection relation between the unit areas shown by the character lattice and the regular lattice; and
    a node coupling step of coupling the preceding node, which is extracted in the node extracting step and has the largest number of coupling to the preceding node, to the newly coupling node.

3. The area extraction program as claimed in claim 2, wherein, in the coupling step, when there are a plurality of preceding nodes with the largest coupling number, regarding the corresponding plurality of preceding nodes, the preceding node included in the path and the newly coupling node are coupled to each other based on a reproducing ratio of reproducing the connection relation between the unit areas shown by the regular lattice.

4. The area extraction program as claimed in claim 1, wherein, in the determining step, the optimum path is determined based on a reproducing ratio of reproducing the connection relation between the unit areas shown by a regular lattice.

5. The area extraction program as claimed in claim 4, wherein, in the determining step, when there are a plurality of paths with the largest reproducing ratio, regarding the corresponding plurality of paths, the optimum path is determined based on a matching ratio of fitting to the connection relation between the unit areas shown by the character lattice.

6. The area extraction program as claimed in claim 1, wherein the judging step further comprises:
a calculating step of, with respect to patterns in the unit area in the character lattice in each of the combinations of the unit areas, calculating a recognition reliability showing a ratio between a character recognition accuracy in a case where character recognition is executed using a dictionary for characters including all characters and the character recognition accuracy in a case where the character recognition is executed using a dictionary for categories in which only characters in a category, to which the unit areas in the regular lattice belong, is included,
wherein a combination in which the recognition reliability calculated in the calculating step meets a predetermined standard is determined to be likely to be established.

7. A non-transitory computer readable recording medium, in which a program executing an area extraction method is recorded, the program when executed by a computer causes the computer to perform the method comprising:
an obtaining step of obtaining a character lattice showing a connection relation between unit areas, which are obtained by separating a character string pattern in an image into patterns each recognized as corresponding to a single character;
a judging step of judging whether or not all combinations of each of the unit areas in the character lattice obtained in the obtaining step and each of the unit areas in a regular lattice defining a regular connection relation between the unit areas are likely to be established;
a generating step of generating a path coupling between nodes corresponding to the combination of the unit areas, which is determined as likely to be established in the judging step;
a determining step of determining an optimum path from the paths generated in the generating step based on a degree of coincidence with the regular lattice or the character lattice;
an extracting step of extracting, from an image, the unit areas in the character lattice corresponding to the optimum path determined in the determining step; and
a recognizing step of applying character recognition to a pattern in the unit area, extracted in the extracting step, with use of a dictionary for categories, including only characters in a category to which the unit areas in the regular lattice belong.

8. A character recognition device comprising:
acquisition means for acquiring a character lattice showing a connection relation between unit areas, which are obtained by separating a character string pattern in an image into patterns each recognized as corresponding to a single character;
judgment means for judging whether or not all combinations of each of the unit areas in the character lattice acquired by the acquisition means and each of the unit areas in a regular lattice defining a regular connection relation between the unit areas are likely to be established;
generating means for generating a path coupling between nodes corresponding to the combination of the unit areas, which is determined as likely to be established by the judging means;
determining means for determining an optimum path from the paths generated by the generating means based on a degree of coincidence with the regular lattice or the character lattice;
extraction means for extracting, from an image, the unit areas in the character lattice corresponding to the optimum path determined by the determining means; and
recognition means for applying character recognition to a pattern in the unit area, extracted by the extraction means, with use of a dictionary for categories, including only characters in a category to which the unit areas in the regular lattice belong.

9. A character recognition method comprising:
an obtaining step of obtaining a character lattice showing a connection relation between unit areas, which are obtained by separating a character string pattern in an image into patterns each recognized as corresponding to a single character;
a judging step of judging whether or not all combinations of each of the unit areas in the character lattice obtained in the obtaining step and each of the unit areas in a regular lattice defining a regular connection relation between the unit areas are likely to be established;
a generating step of generating a path coupling between nodes corresponding to the combination of the unit areas, which is determined as likely to be established in the judging step;
a determining step of determining an optimum path from the paths generated in the generating step based on a degree of coincidence with the regular lattice or the character lattice;
an extracting step of extracting from an image the unit areas in the character lattice corresponding to the optimum path determined in the determining step; and
a recognizing step of applying character recognition to a pattern in the unit area, extracted in the extracting step, with use of a dictionary for categories, including only characters in a category to which the unit areas in the regular lattice belong.

10. A character recognition device, comprising:
an acquisition part acquiring a character lattice showing a connection relation between unit areas, which are obtained by separating a character string pattern in an image into patterns each recognized as corresponding to a single character;
a judgment part judging whether or not all combinations of each of the unit areas in the character lattice acquired by the acquisition part and each of the unit areas in a regular lattice defining a regular connection relation between the unit areas are likely to be established;
a generating part generating a path coupling between nodes corresponding to the combination of the unit areas, which is determined as likely to be established by the judging part;
a determining part determining an optimum path from the paths generated by the generating part based on a degree of coincidence with the regular lattice or the character lattice;
an extraction part extracting, from an image, the unit areas in the character lattice corresponding to the optimum path determined by the determining part; and
a recognition part applying character recognition to a pattern in the unit area, extracted by the extraction part, with use of a dictionary for categories, including only characters in a category to which the unit areas in the regular lattice belong.

* * * * *